March 4, 1941.   C. R. ALDEN   2,233,571
MACHINE TOOL
Original Filed April 30, 1934   3 Sheets-Sheet 1

INVENTOR
Carroll R. Alden
By Parker, Carlson, Pitzner & Hubbard
ATTORNEYS

March 4, 1941. C. R. ALDEN 2,233,571
MACHINE TOOL
Original Filed April 30, 1934 3 Sheets-Sheet 3

INVENTOR
Carroll R. Alden
By Parker, Carlson, Pitzner & Hubbard
ATTORNEYS

Patented Mar. 4, 1941

2,233,571

UNITED STATES PATENT OFFICE 2,233,571

MACHINE TOOL

Carroll R. Alden, Detroit, Mich., assignor to Ex-Cell-O Corporation, Detroit, Mich., a corporation of Michigan Original application April 30, 1934, Serial No. 723,135. Divided and this application July 13, 1938, Serial No. 218,898

11 Claims. (Cl. 77—3)

The present application is a division of my copending application Serial No. 723,135, filed April 30, 1934 (Patent No. 2,158,060), and has particular reference to a machine tool with novel means for controlling the drive of the machine tool spindle or spindles.

One of the objects of the invention is to provide a machine tool having a motor driven spindle and a movable support, and having novel brake and switch actuators for controlling the stopping and starting of the spindle in response to the predetermined movements of the support.

Another object resides in connecting the switch and brake actuators in parallel for simultaneous operation, and providing means for retarding the operation of the brake actuator when applying the brake.

A further object is to provide a new and improved machine tool having alternately operable spindles and a reciprocatory carriage, and having novel hydraulically operable brake and switch actuators for controlling the drive of the spindles, said actuators being controlled by the carriage to release the brake and energize the motor for one spindle and to apply the brake and deenergize the motor for the other spindle upon movement of the carriage in one direction and to apply the brake and deenergize the motor for said one spindle and to release the brake and energize the motor for said other spindle upon movement of the carriage in the reverse direction.

Another object is to provide a novel machine tool having a spindle and a movable carriage, a hydraulic operating mechanism including a reversible direction control valve for driving the carriage, and a spindle drive including a control reversibly operable simultaneously with the reversal of said valve for alternately starting and stopping the spindle upon movement of the carriage respectively in opposite directions into predetermined positions of reversal.

Further objects and advantages will become apparent as the description proceeds.

In the accompanying drawings.

Figure 1:
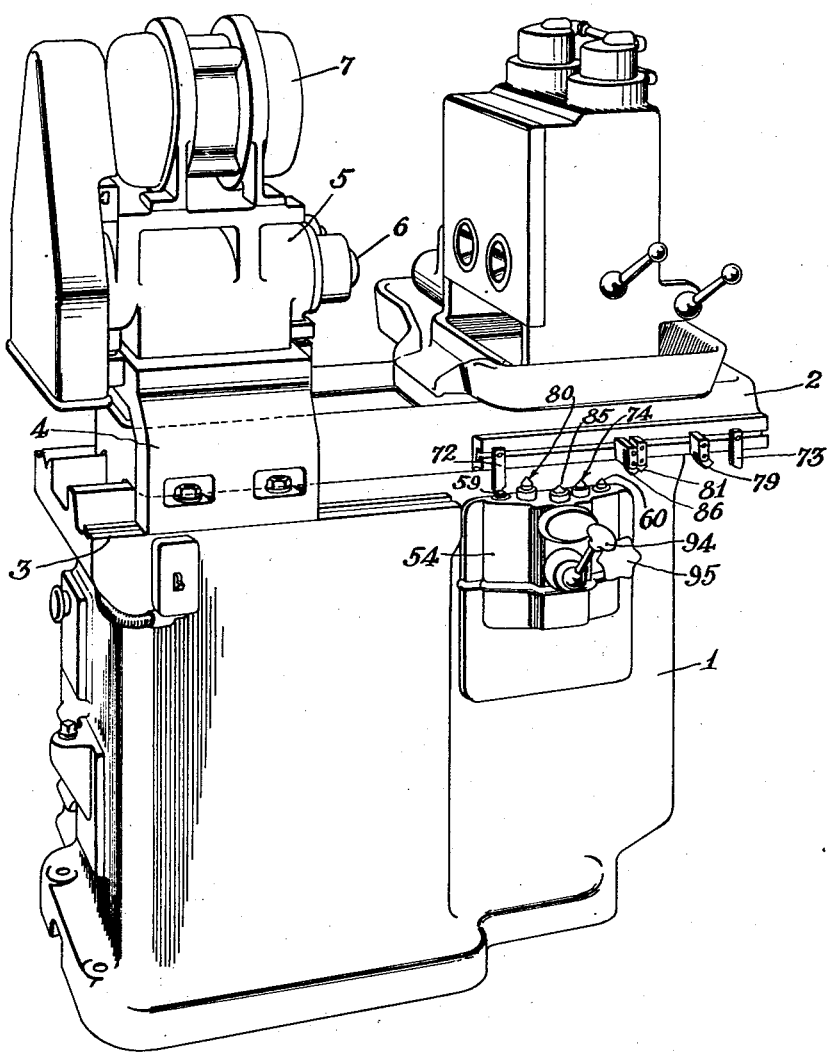
Figure 1 is a front perspective view of a machine embodying the features of my invention.
Figure 2:
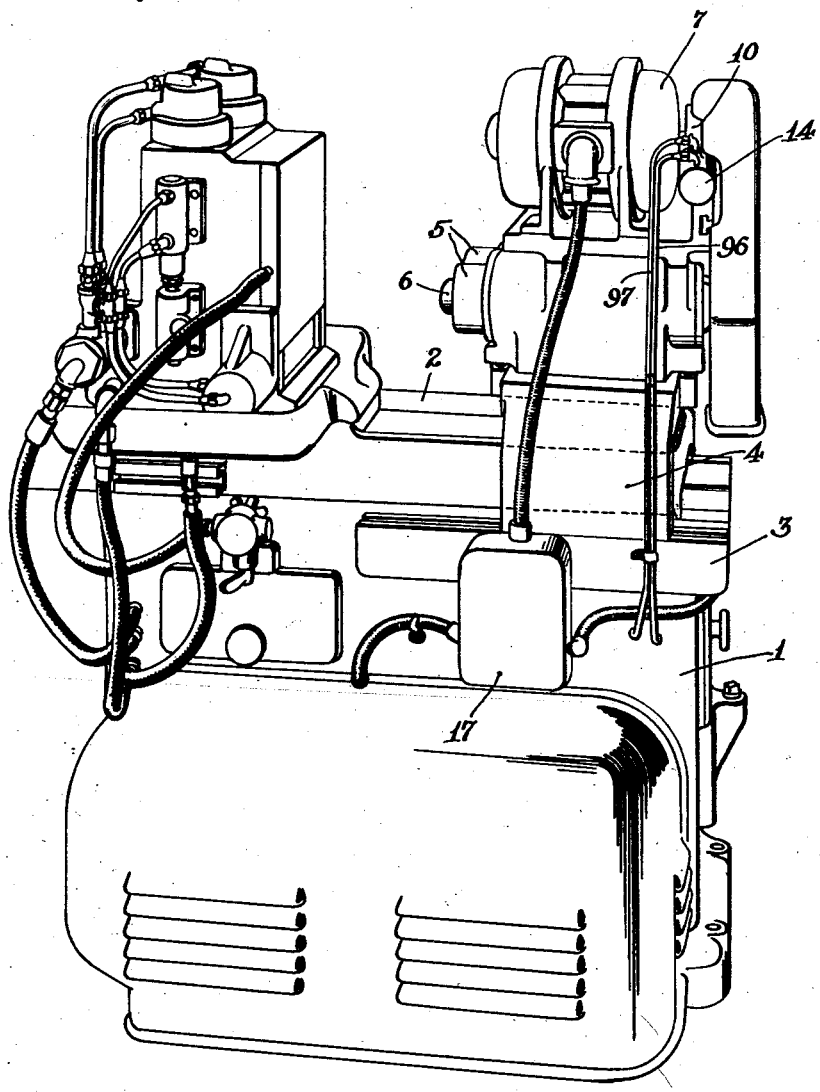
Fig. 2 is a rear perspective view of the machine.

Referring more particularly to the drawings, the invention, for purposes of illustration, is disclosed as embodied in a machine tool (see Figs. 1 and 2) comprising an elongated hollow base 1 on the top of which a carriage 2 is mounted for longitudinal reciprocation, and which is formed on the opposite sides of one end with auxiliary guideways 3 parallel to the direction of movement of the carriage. An inverted U-shaped bridge member 4 is rigidly mounted on the guideways 3 for adjustment longitudinally of the base 1, and serves as a support for one or more, for example, two, parallel brackets 5. Rotary spindles 6 are journaled respectively in the brackets 5, and are adapted to be driven from a suitable source of power, such as an electric motor 7.

The motor 7 is provided with a suitable braking mechanism for stopping the rotation of the spindles 6. In the present instance, the braking mechanism comprises a brake drum 8 fixed on the motor shaft 9 (see Fig. 3), and a brake band 10 extending partially about the drum. The free ends of the band 10 are connected by a cross bar 11 fixed on one end of an actuating rod 12. A pressure fluid responsive piston 13 slidable in a cylinder 14 is directly attached to the rod 12, and upon reciprocation in opposite direction acts to apply and release the band 10.

Any suitable circuits may be provided for energizing the motor 7. In the present instance, the motor 7 is of the alternating current type, and is adapted to be connected to electric supply lines $L_1$, $L_2$ and $L_3$ by a magnetic switch 15 having an actuating coil 16. A control switch 17 is adapted to close a circuit through the coil 16 as follows: from the main line $L_1$, through a line 18, a fixed contact 19, a movable contact 20, a fixed contact 21, a line 22, the coil 16, and a line 23 to the main line $L_2$. The movable contact 20 is operable through a reciprocatory rod 24 connected to a pressure fluid responsive piston 25 slidable in a cylinder 26.

Figure 3:
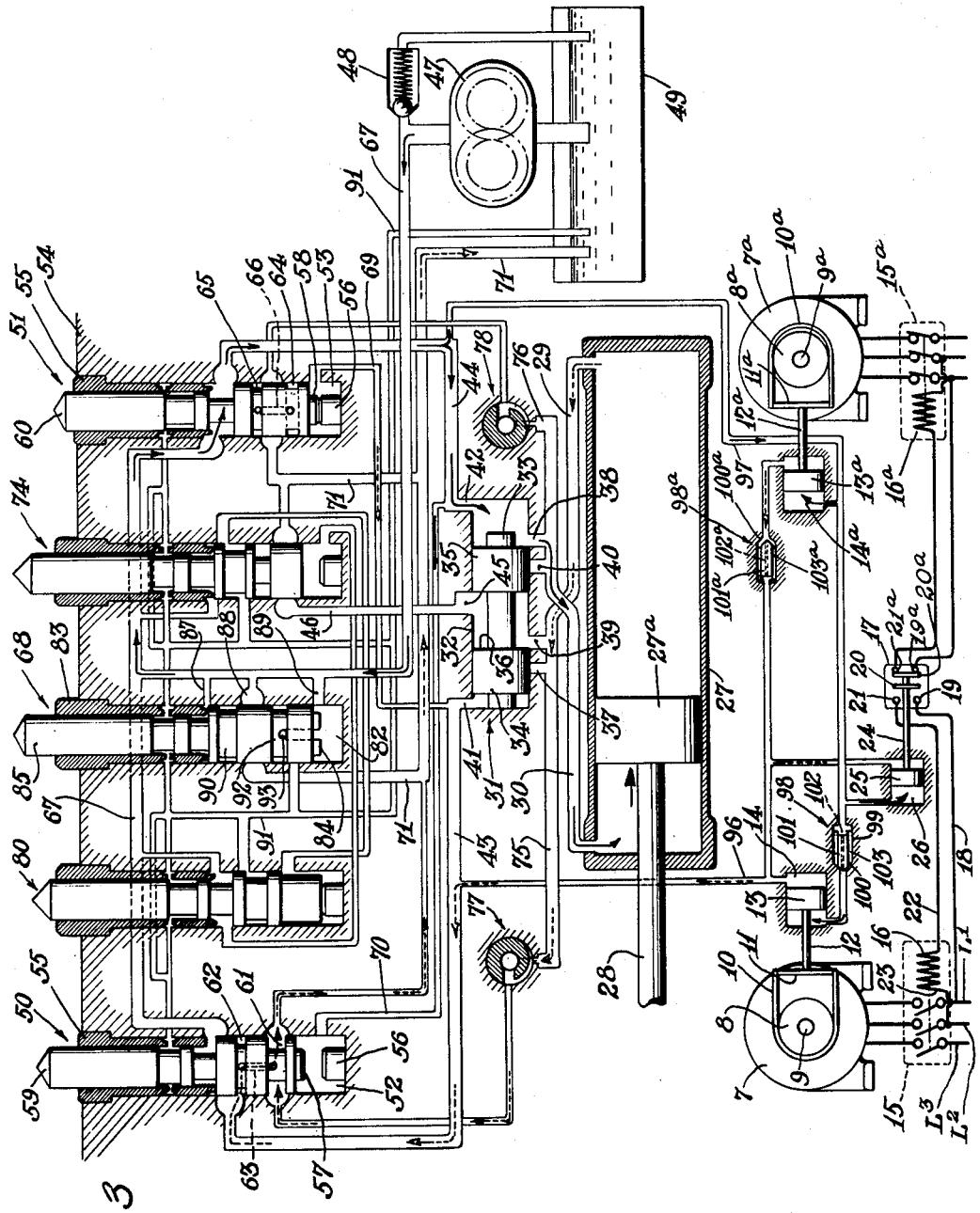
Fig. 3 is a diagrammatic representation of one form of the hydraulic operating mechanism with the parts adjusted for a slow feed traverse of the carriage to the right.

It will be understood that a similar spindle head structure may be provided at the other end of the base 1 to constitute the machine tool one of the double end type similar to that disclosed in my Patent No. 2,000,553. Fig. 3 illustrates a motor control circuit and a braking mechanism for such duplicate structure, and the corresponding parts thereof are identified by the same reference numerals distinguished by the exponent "a." Preferably, the movable contacts 20 and $20^a$ are connected for joint actuation so that upon movement of the piston 25 in one direction, the contact 20 will bridge the contacts 19 and 21 to institute the operation of the motor 7, and upon movement of the piston in the reverse direction, the contact $20^a$ will bridge the contacts 19ª and 21ª to institute operation of the motor 7ª.

The brake pistons 13 and 13ª and the switch piston 25 are operated in conjunction with a hydraulic transmission mechanism for traversing the carriage 2. This mechanism may be provided in various forms within the broad aspects of the present invention, and in the form shown comprises a hydraulic motor having a cylinder 27 mounted in fixed position within the base 1, and a piston 27ª reciprocable in the cylinder and connected through a piston rod 28 to the carriage 2. Opening from the cylinder 27 respectively at opposite sides of the piston 27ª are two fluid supply and discharge conduits 29 and 30 leading to a direction valve 31.

The direction valve 31 may be of any desired construction, and preferably comprises an elongated cylinder bore 32 closed at opposite ends. A valve piston 33 of the spool type, comprising axially spaced heads 34 and 35 separated by an annular space 36, is mounted for reciprocation in the bore 32. Opening to the bore 32 intermediate its ends are two longitudinally spaced pressure ports 37 and 38, and, between the latter, two longitudinally spaced exhaust ports 39 and 40. These ports are so arranged that when the piston 33 is in one end position, the ports 37 and 40 will be closed by the heads 34 and 35, and the ports 39 and 38 will be open respectively to the space 36 and one end of the bore 32, and when the piston occupies the opposite end position, the ports 37 and 40 will be open respectively to the other end of the bore 32 and the space 36, and the ports 38 and 39 will be closed. The ports 37 and 39 are connected in parallel to the conduit 29, and the ports 38 and 40 are similarly connected to the conduit 30. Fluid supply and discharge ports 41 and 42 open respectively to opposite ends of the bore 32, and are connected to conduits 43 and 44. An exhaust port 45, connected to a conduit 46, opens to the bore 32 between the ports 39 and 40, and is always in communication with the space 36.

The conduits 43 and 44 are adapted to be connected respectively and reversibly by an automatic reset pilot direction control to a suitable source of pressure fluid, such as a constant flow pump 47 having a pressure relief overflow 48, and a drain, such as a sump 49, to control the position of the valve piston 33, and thereby the direction of operation of the motor piston 27ª. It will be evident that when the port 42 is connected to the pump 47 and the port 41 is connected to the sump 49, the valve piston 33 will be moved into its left hand position. Thereupon, fluid will be supplied to the conduit 30 and exhausted from the conduit 29 to effect movement of the piston 27ª and hence the carriage 2 to the right (see Fig. 3). Upon connecting the port 41 to the pump 47 and the port 42 to the sump 49, the movement of the carriage 2 will be reversed.

The automatic reset pilot direction control is responsive to the movement of the carriage 2, and comprises two valves 50 and 51 for effecting reversal of the carriage respectively to the left and right. These valves respectively comprise chambers or cylinder bores 52 and 53 which may be formed in any suitable casings, and which in the present instance open vertically through a plate or apron 54 secured to the front of the base 1. Each of the cylinder bores 52 and 53 is closed at its lower end, and has a bushing 55 secured in its upper end. A stop pin 56 projects upwardly from the lower end.

Respectively disposed in the cylinder bores 52 and 53 for reciprocation between the stops 56 and the bushings 55 are two valve pistons 57 and 58 of the spool type provided respectively with actuating plungers 59 and 60 extending through the bushings for external engagement. The piston 57 is formed in its periphery with longitudinally spaced annular grooves 61 and 62 in communication with an axial passage 63. Similarly, the piston 58 has two longitudinally spaced peripheral grooves 64 and 65 opening to an axial passage 66.

A branched conduit 67 opens constantly to the bores 52 and 53 above the pistons 57 and 58, and is adapted to supply, subject to control by a stop valve 68, motive fluid under full pressure from the pump 47. The conduits 43 and 44 from the direction valve 31 open respectively to the cylinder bores 52 and 53 for selective connection with the pressure conduit 67 when the related pistons 57 and 58 are lowered against the stops 56, and with the grooves 62 and 65 when the pistons are raised against the bushings 55. Cross conduits 69 and 70 respectively branch from the conduits 43 and 44, and open constantly to the lower ends of the bores 53 and 52. Also opening to the bores 52 and 53 for communication respectively with the grooves 61 and 64 when the related pistons 57 and 58 are in their uppermost positions is a drain conduit 71 discharging to the sump 49.

The upper ends of the plungers 59 and 60 are beveled to constitute reversing abutments adapted for engagement by suitable control dogs 72 and 73 mounted on the front of the carriage 2.

Assuming that fluid under pressure is available in the conduit 67 and that the plunger 60 is depressed (see Fig. 3), pressure fluid will be supplied from the conduit 67, through the cylinder bore 53, and the conduit 44 to the right end of the direction valve bore 32, and from the conduit 44 through the cross conduit 70 to the lower end of the bore 52. Thereupon, the piston 57, by reason of its differential areas, will be raised into its uppermost position to connect the left end of the bore 32 and the lower end of the bore 53 through the conduits 43 and 69, the groove 62, the passage 63, and the groove 61 to the drain conduit 71. As a result, the plunger 60 will be retained in its lowermost position, and the direction valve piston 33 will be moved to the left to institute movement of the carriage 2 to the right. When the carriage 2 reaches its right limit position, the dog 72 will depress the plunger 59 to lower the valve piston 57, the fluid in the chamber 52 being backed up into the conduit 70 against the pressure in the connection to the source. Thereupon the conduits 43 and 69 will be connected to the pressure conduit 67 to elevate the valve piston 58, and then the conduits 44 and 70 will be connected to the drain conduit 71. This will reverse the direction valve 31 to institute movement of the carriage 2 to the left. At the left limit position, the dog 73 will again depress the plunger 60 to establish the initially described hydraulic circuits. It will be evident that each of the pilot valves 50 and 51 upon being actuated by the carriage 2 not only reverses the direction valve 31, but also resets the other pilot valve in operative position.

Provision is made for varying the rate of fluid discharge from the motor cylinder 27 to obtain a rapid traverse or a feed of the carriage 2 in each direction of movement. For rapid traverse, the exhaust fluid is always discharged through the direction valve 31 to the conduit 46 which is unrestricted, and which is adapted to be closed or connected to the drain conduit 71 by a rapid traverse valve 74. For feed, the exhaust fluid is adapted to be directed through one or the other of two restricted conduits 75 and 76 respectively branching from the conduits 29 and 30, and leading to the valves 50 and 51 for connection to the drain conduit 71 when the valve pistons 59 and 60 are elevated. Thus, assuming that the carriage 2 is moving to the right (see Fig. 3) and that the conduit 46 is closed by the valve 74, the conduit 76 will be closed by the valve 51 to maintain the pressure in the conduit 30, and fluid will be discharged from the cylinder 27 through the conduit 29, the conduit 75, and the groove 61 to the drain conduit 71, thereby effecting a slow feed. Conversely, under the same conditions but with the carriage 2 moving to the left, the conduit 75 will be closed, and fluid will be discharged from the cylinder 27 through the conduits 30 and 76 and the groove 64 to the drain conduit 71, thereby effecting a slow feed in the opposite direction. When the conduit 46 is open, the discharge of the fluid will be unrestricted to effect a rapid traverse.

The feed conduits 75 and 76 are restricted respectively by two orifice valves 77 and 78 which are independently adjustable to vary the rate of feed in either direction. Therefore, since one or the other of the orifice valves 77 and 78, depending on the direction of carriage movement, is adapted to be in sole control of the rate of feed, the feed in either direction may be made faster or slower than in the other direction.

The rapid traverse valve 74 is adapted to be actuated through engagement of a dog 79 on the carriage 2 to institute rapid traverse, and to be elevated under the control of a pilot feed valve 80 to institute the feed. In the single end machine, the dog 79 is pivotal in one direction out of vertical center position to flip over the valve 74 upon movement of the carriage 2 to the left, and is arranged to depress the valve immediately after reversal of the carriage to the right. For a double end machine, two dogs 79 may be provided effective at opposite ends of the carriage movement.

The pilot feed valve 80 is adapted to be actuated by engagement of a dog 81 on the carriage 2 to institute the feed, and to be reset into and held in operative position when the rapid traverse is instituted by depressing the valve 74. For a double end machine, two dogs 81 respectively adapted to depress the valve 80 during the travel of the carriage 2 in opposite directions may be provided. The two valves 74 and 80 act as pilot valves for alternately resetting each other. Either valve when reset will cause the other to be held down.

Variation of the speed of the carriage 2, under the control of the valves 74, 77, 78 and 80, does not influence the operation of the spindles 6. Hence, the valves 74, 77, 78 and 80 are not described in detail, but for a complete description reference may be had to my aforesaid Patent No. 2,158,060.

The stop valve 68 when actuated to stop the carriage 2 is operative to connect the pressure conduit 67 to the drain conduit 71. It comprises a chamber or bore 82 opening vertically through the apron 54 with a bushing 83 seated in the upper end, and a valve piston 84 reciprocable in the bore and having a plunger 85 extending upwardly through the bushing for external actuation. The plunger 85 is adapted for engagement by a dog 86 pivotal in one direction, for example, to the right, out of vertical position on the front of the carriage 2. In the single end machine, the dog 86 is positioned to depress the plunger 85 upon movement of the carriage 2 away from the spindle head structure 4, 5, 6 into a remote inoperative position. For the double end machine, the dog 86 may be positioned midway of the dogs 72 and 73, and may be inoperative to depress the plunger 85 in one direction of carriage movement, for example, to the left, so that the carriage cycle may comprise movement from an inoperative intermediate position into one end position, then a reverse movement past the intermediate position into the other end position, and then a return movement to the intermediate position. It will be understood that if the dog 86 is removed or rendered inoperative, the carriage 2 will reciprocate continuously.

A specific selection and arrangement of reversing, traverse control and stop dogs, for single and double end machines has been disclosed. The invention, however, is not limited to any particular carriage program, the latter being adapted for variation by the selection and arrangement of carriage dogs to suit the working requirements of the machine. If a substantial number of dogs are required, and these are closely spaced, some of the dogs may be mounted on an auxiliary support (not shown) adapted to be attached to the carriage 2.

The pressure conduit 67 is connected directly to the discharge of the pump 47, and has three parallel branches 87, 88 and 89 opening respectively to the valve bore 82 at the upper end, an intermediate point, and the lower end. The exhaust conduit 71 opens to the valve bore 82 in the same transverse plane as the branch conduit 88. The piston 84 when in its uppermost position blanks the conduits 71 and 88, and is held in position by the differential pressure acting on its opposite ends. In this position of the piston 84, the system is at full pressure, and hence operative. The piston 84 is formed with an annular groove 90 adapted to connect the conduits 71 and 88 to relieve the pressure when the piston is in its lowermost position.

An auxiliary drain conduit 91 also opens to the bore 82 at a point between the branch conduits 88 and 89 and is adapted to be connected to the lower end of the bore through an annular groove 92 and a bleed passage 93 formed in the piston 84 when the latter is depressed. The purpose of the bleed connection is to permit the piston 84 to move way down into its lowermost position. When the plunger 85 is depressed to connect the conduits 71 and 88, the piston 84 will close the conduit 89 so that the pressure in the lower end of the bore 82 will be completely dissipated. Hence, the piston 84 will remain in its inoperative position.

The plunger 85 may be elevated manually to start the operation of the machine. The means for this purpose is fully disclosed in my aforesaid parent application, and comprises a hand lever 94. Reversal of the movement of the carriage 2 normally is effected automatically by the dogs 72 and 73. The carriage movement may be reversed manually without regard to the position of the carriage 2 by actuating a hand knob 95 to reverse the valves 50 and 51.

The brake cylinders 14 and 14ª are reversely connected in parallel with each other and with the direction valve 31 across the conduits 43 and 44 under the direct control of the valves 50 and 51. Similarly, the switch cylinder 26 is connected in parallel with the brake cylinders 14 and 14ª. Hence, when the carriage 2 in the single end machine is reversed to move toward the spindle head structure, the brake band 10 will be automatically released and the circuit through the coil 16 will be closed. Conversely, upon reversal of the carriage 2 to move in the opposite direction (see Fig. 3), the brake band 10 will be applied and the motor 7 will be rendered inoperative. In the double end machine, the operation is the same for the motor 7ª and the brake band 10ª with reference to the opposite spindle head structure. Thus, the brake band 10ª is applied and the coil 16ª is deenergized when the band 10 is released and the coil 10 is energized, and vice versa.

The hydraulic circuits, more particularly, comprise a branched conduit 96 opening from the conduit 43 respectively to the outer end of the cylinder 14, the inner end of the cylinder 14ª and one end of the cylinder 26, and a second branched conduit 97 opening from the conduit 44 respectively to the opposite ends of the cylinders 14, 14ª and 26. By reason of their parallel arrangement with the direction valve 31, the hydraulic actuators for the brakes and the motor control switches are operable without delay, without first awaiting reversal of the valve 31, upon instituting the reversal of the carriage 2 in either direction. Moreover, they are always subject to a substantial pressure differential under all conditions of machine operation since the opposite ends of each cylinder are always connected respectively to the high pressure side of the system and the drain.

To prevent either of the brake bands 10 and 10ª from being applied before the associated motor switch is opened, one-way bleed valves 98 and 98ª are interposed in the conduits 97 and 96 respectively at the inlets to the inner ends of the cylinders 14 and 14ª. The bleed valve 98 comprises a chamber 99 having a valve seat 100 opening to the small end of the cylinder 14. Slidable in the chamber 99 is a free floating valve member 101 which has a restricted passage 102 always open to the cylinder 14, and a plurality of longitudinal flutes 103 for the free passage of fluid adapted to be closed by the seat 100. When fluid under pressure is supplied to the conduit 97, the piston 25 will be actuated immediately to open the switch contacts 19, 21 and 20. The piston 13 will also be actuated to apply the brake band 10, but its movement will be retarded by the valve 98. Upon supplying fluid under pressure to the conduit 96, both pistons 13 and 25 will be actuated simultaneously in the opposite direction. The valve 98ª preferably is the same in construction as the valve 98 and hence the corresponding parts are identified by the same reference numerals with the exponent "a."

I claim as my invention:

1. A machine tool comprising, in combination, a base, a movable support and a fixed support on said base, a spindle journaled on one of said supports, means for reciprocating said movable support through a predetermined range, a brake for said spindle, a hydraulic piston and cylinder unit for applying and releasing said brake, fluid supply passages opening respectively to opposite ends of said unit, a source of fluid under pressure, an exhaust passage, and valve means operable directly by said movable support to connect one of said supply passages to said source and the other of said supply passages to said exhaust passage upon movement of said movable support into one end position, and to reverse such connections upon movement of said movable support into the other end position respectively to apply and release said brake.

2. A machine tool comprising, in combination, a base, a movable support and a fixed support on said base, a spindle journaled on one of said supports, means for reciprocating said movable support through a predetermined range, a brake for said spindle, a hydraulic piston and cylinder unit for applying and releasing said brake, fluid supply passages opening respectively to opposite ends of said unit, a source of fluid under pressure, an exhaust passage, valve means operable directly by said movable support to connect one of said supply passages to said source and the other of said supply passages to said exhaust passage upon movement of said movable support into one end position, and to reverse such connections upon movement of said movable support into the other end position respectively to apply and release said brake, and valve means interposed in said one passage to restrict the flow of fluid to said unit while permitting a free discharge of fluid from said unit, whereby to retard the application of said brake while permitting a quick release of said brake.

3. A machine tool comprising, in combination, a base, a movable support and a fixed support on said base, a spindle journaled on one of said supports, a piston and cylinder unit for reciprocating said movable support through a predetermined range, a reversible direction valve for controlling the operation of said unit, a brake for said spindle, a piston and cylinder unit for applying and releasing said brake, fluid supply passages leading to opposite ends of said valve and said last mentioned unit and connecting them in parallel, a source of fluid under pressure, an exhaust, and valve means automatically operable in response to movement of said movable support into one end position to connect one of said supply passages to said source and the other of said supply passages to said exhaust, and upon reverse movement of said movable support into the other end position to reverse such connections.

4. A machine tool comprising, in combination, a base, a movable support and a fixed support on said base, a spindle journaled on one of said supports, a piston and cylinder unit for reciprocating said movable support through a predetermined range, a reversible direction valve for controlling the operation of said unit, an electric motor for driving said spindle, a switch for controlling the operation of said motor, a piston and cylinder unit for opening and closing said switch, fluid supply passages leading to opposite ends of said valve and said last mentioned unit and connecting them in parallel, a source of fluid under pressure, an exhaust, and valve means automatically operable in response to movement of said movable support into one end position to connect one of said supply passages to said source and the other of said supply passages to said exhaust, and upon reverse movement of said movable support into the other end position to reverse such connections.

5. In a machine tool, a support, a spindle journaled on said support, an electric motor for driving said spindle, a brake for stopping said spindle, a switch for controlling the operation of said motor, two hydraulic piston and cylinder actuating units respectively connected to said brake and switch, two branched supply passages leading respectively to opposite ends of each unit and connecting said units in parallel, a source of fluid under pressure, an exhaust, and valve means for connecting said source selectively to either passage and simultaneously connecting the other passage to said exhaust, whereby to apply said brake and open said switch or to release said brake and close said switch.

6. In a machine tool, a support, a spindle journaled on said support, an electric motor for driving said spindle, a brake for stopping said spindle, a switch for controlling the operation of said motor, two hydraulic piston and cylinder actuating units respectively connected to said brake and switch, two branched supply passages leading respectively to opposite ends of each unit and connecting said units in parallel, a source of fluid under pressure, an exhaust, valve means for connecting said source selectively to either passage and simultaneously connecting the other passage to said exhaust, whereby to apply said brake and open said switch or to release said brake and close said switch, and means automatically operable to delay the application of said brake until said switch is opened.

7. A machine tool comprising, in combination, a base, a movable support and a fixed support on said base, a spindle journaled on one of said supports, a piston and cylinder unit for reciprocating said movable support through a predetermined range, a reversible direction valve for controlling the operation of said unit, a brake for said spindle, a hydraulic piston and cylinder unit for applying and releasing said brake, an electric motor for driving said spindle, a switch for controlling the operation of said motor, a piston and cylinder unit for opening and closing said switch, fluid supply passages opening respectively to opposite ends of said valve and said two last mentioned units and connecting them in parallel, a source of fluid under pressure, an exhaust, and valve means operable selectively to connect one of said supply passages to said source and the other of said supply passages to said exhaust, or to reverse such connections.

8. A machine tool comprising, in combination, a base, a movable support and a fixed support on said base, a spindle journaled on one of said supports, an electric motor for driving said spindle and having a normally open control switch and a solenoid for closing said switch, a circuit including a switch for energizing said solenoid, a brake drum on the motor shaft, a brake band movable into and out of engagement with said drum, two hydraulic actuators connected respectively to said last mentioned switch and said band, branch fluid conduits connecting said hydraulic actuators in parallel, a source of fluid under pressure, an exhaust, and valve means operable by said movable support to connect said conduits alternately and reversibly to said source and said exhaust.

9. A machine tool comprising, in combination, a base, a movable support and a fixed support on said base, a spindle journaled on one of said supports, a piston and cylinder unit for reciprocating said movable support through a predetermined range, a reversible direction valve for controlling the operation of said unit, pilot valves operable by said movable support for controlling said direction valve, means for controlling the operation of said spindle, and a piston and cylinder unit for reversibly actuating said means, said last mentioned piston and cylinder unit being operable simultaneously with said direction valve under the control of said pilot valves.

10. A machine tool comprising, in combination, a base, a movable support and a fixed support on said base, two spindles journaled on one of said supports and having operative ends projecting in opposite directions, a hydraulic motor for reciprocating said movable support, a hydraulically operable reversible direction valve for controlling said unit, two brakes respectively for said spindles, two hydraulic piston and cylinder units respectively for applying and releasing said brakes alternately, two electric motors respectively for driving said spindles, two switch means respectively for controlling the operation of said motors, a piston and cylinder unit operable reversibly to open and close each of said switches alternately, fluid supply passages connecting said valve and said hydraulic units in parallel, a source of fluid under pressure, and valve means operable by said movable support for selectively connecting said passages alternately to said source.

11. A machine tool comprising, in combination, a base, a movable support and a fixed support on said base, a spindle journaled on one of said supports, a piston and cylinder unit for reciprocating said movable support through a predetermined range, a reversible direction valve for controlling the operation of said unit, a brake for said spindle, a piston and cylinder unit for applying and releasing said brake, fluid passages leading to opposite ends of said valve and said last mentioned unit and connecting them in parallel, a source of fluid under pressure, an exhaust, and valve means automatically operable in response to movement of said movable support into one end position to connect one of said fluid passages to said source and the other of said fluid passages to said exhaust.

CARROLL R. ALDEN.